L. McLAWS
Apparatus for Preventing the Boiling Over of Liquids.
No. 214,168. Patented April 8, 1879.

WITNESSES:
Achilles Schehl.
C. Sedgwick

INVENTOR:
Lafayette McLaws
BY Munn & Co
ATTORNEYS.

UNITED STATES PATENT OFFICE.

LAFAYETTE McLAWS, OF SAVANNAH, GEORGIA.

IMPROVEMENT IN APPARATUS FOR PREVENTING THE BOILING OVER OF LIQUIDS.

Specification forming part of Letters Patent No. 214,168, dated April 8, 1879; application filed December 19, 1878.

*To all whom it may concern:*

Be it known that I, LAFAYETTE McLAWS, of Savannah, in the county of Chatham and State of Georgia, have invented a new and useful Improvement in Apparatus for Preventing the Boiling Over of Liquids, of which the following is a specification.

Figure 1:
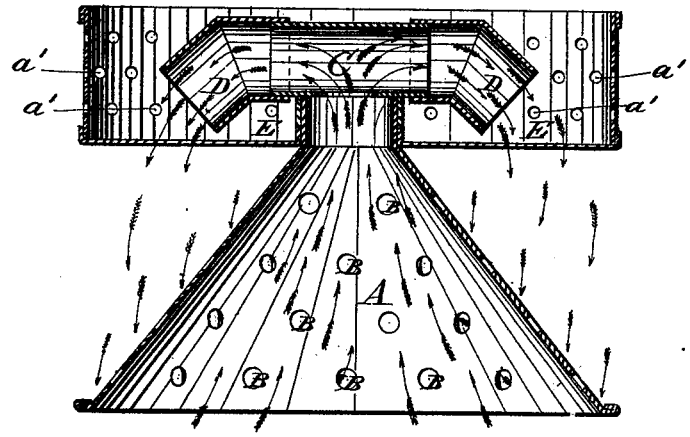
Figure 2:
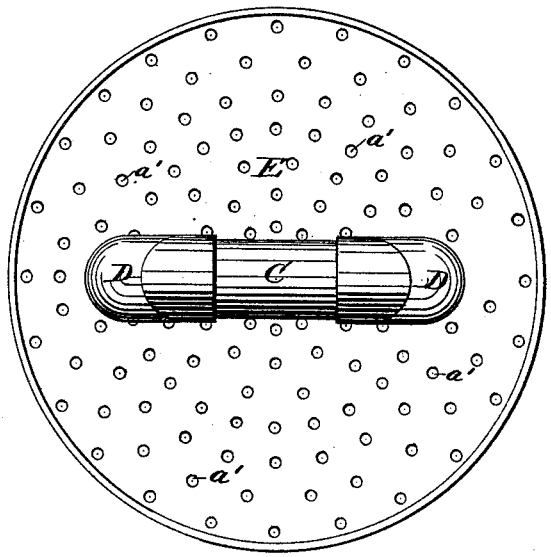

Figure 1 is a vertical section of the apparatus. Fig. 2 is a plan of the same.

Similar letters of reference indicate corresponding parts.

The object of this invention is to prevent liquids from boiling over the sides of the vessel in which they may be boiling.

The truncated cone A is made of metal, the bottom or base of which is made broad enough to cover the space in the bottom of the boiler which is in main contact with the fire, or to cover the principal part of it, and high enough so that the bottom of the spouts, to be referred to hereinafter, will be three or four inches above the surface of the liquid in the boiler in which the liquid to be boiled may be placed.

Perforations B B, to any desired number, so that their united space may be somewhat in excess of the space open at the apex of the cone, are made around and near the bottom, so that when the hottest water is thrown to the surface, up the cone, and out of the spouts, the colder portions, which are those away from the bottom of the boiler, may readily rush in to be heated, and in turn to be thrown up and into the colder liquid on the surface, thus preventing the boiling over, and expediting the heating of the whole mass in the boiler.

Upon the cone I preferably place a cap, C, having one or more spouts, D D, so bent that the liquid, as it is boiled up, is thrown directly down and back into the liquid below.

I also place on top of the cone E a basin, circular in form, as being most conveniently manufactured, the bottom of which is either ire-gauze or of metal which is perforated with very fine holes, which acts as a skimmer, intercepting the scum and dirt which are brought to the surface, up the cone, and through the spouts, and preventing their return to the liquid in the boiler. When this cone is placed base downward in a boiler filled with liquid, and the liquid brought to a boiling-point or placed in a liquid already boiling, the hottest portion of the liquid will be at the bottom, where the fire strikes the boiler, and will be thrown up through the cone and spouts into the cooler liquid on the surface, as heretofore explained, and prevents an overflow, or immediately arrests it if it was overflowing at the time.

The overflow would be prevented by placing the cone above in the liquid, without the cap and spouts to concentrate and regulate the overflow, and empty it at certain points in the boiler; for when boiling, with the cap and spouts on, either sugar, sirup, soap, &c., the scum collects in a body in the eddy or on the sides of the liquid in the boiler, where the liquid is the least agitated by the return flow, and may be removed easily at any time with a common skimmer.

The circular basin E is not a necessary part of the apparatus, so far as preventing the overflow is to be considered; but in some cases, and especially just as the liquid commences to boil, and for a little time thereafter, it serves admirably as a collector of scum—a self-skimmer.

The cone, when not held against the bottom of the boiler by weights, by being confined by wires across the top of the cap or in any other way, will float about in the liquid in the boiler, and still operate effectively as a preventive of overflow; but it is much the best to have it confined to the bottom and center of the boiler, and often for that purpose I use an encircling ring of iron of sufficient weight, with a handle affixed to it, to enable one to remove the ring-weight when desired, and take the cone out of the liquid easily when the moment comes to empty the boiler.

The hottest liquid, and that which is soonest heated, being that in the boiler nearest to the fire, and being covered by the cone, is the first to boil, and is at once thrown up the cone and through the spouts, and back again into the boiler, and thus the whole mass very soon becomes of a uniform and of the highest temperature, and evaporates faster than it would do without the invention; and while preventing an overflow by ebullition, and consequent waste of material, it does away with the attendance of two or more persons acting as skimmers and coolers to each boiler, which without the invention would be necessary to prevent an overflow, and thus allows the application of much greater heat than could be used before without great caution, and generally does away with that particular care to the fires which was formerly so necessary.

I am convinced from closely watching the boiler while making sugar and sirup that the prevention of boiling over is not caused by the liquid being cooled in its passage out of the cone, but because, by the interposition of the cone and cap and spouts, the fluid in boiling is made to take a circular motion, as shown by the arrows in Fig. 1, and boils up through the cone only. In the other parts of the boiler the motion is downward, the cooler fluid, or that away from the bottom of the boiler, where the heat is most intense, rushing in the cone to fill the place of (vacated by) that hotter liquid, which at the moment it arrives at the boiling-point had been thrown up and out of the spouts; and I think the invention the more valuable on that principle, for, as simple as it is, it can be applied and made useful in many other ways than in boiling sugar, sirup, &c. But in whatever way the cause of the prevention of the boiling over may be explained, this invention saves much time, labor, and material, increases the product, and improves the quality of the sirup, sugar, &c., manufactured with its aid.

I am aware that it is not new in liquid and wash boilers to employ a tube with hollow base; but mine is intended specially for use in the sugar-pans, holding from forty to eighty gallons, now in use at the South. As the cane-juice evaporates and thickens, the resistance offered to the escaping steam increases, so that the hollow bases of liquid and wash boilers would be blown out, upset, or rendered useless. Mine, being a cone rising directly from the bottom of the boiler and placed in the juice, with its top protruding a few inches above, offers no stop or hinderance to the rise of the hot fluid or steam.

What I claim as new and of my invention is—

The combination of the truncated cone A, having perforations B, the downward-projecting end-bend spout D, and the perforated basin E, arranged as shown and described, for the purpose specified.

LAFAYETTE McLAWS.

Witnesses:
WM. H. WILL,
WILLIAM COOLIDGE, Jr.